(12) United States Patent
Kolar et al.

(10) Patent No.: US 9,780,676 B2
(45) Date of Patent: Oct. 3, 2017

(54) POWER CONVERTER WITH A SNUBBER CIRCUIT

(71) Applicant: Infineon Technologies Austria AG, Villach (AT)

(72) Inventors: Johann Kolar, Zurich (CH); Matthias Kasper, Zurich (CH)

(73) Assignee: Infineon Technologies Austria AG, Villach (AT)

(*) Notice: Subject to any disclaimer, the term of this patent is extended or adjusted under 35 U.S.C. 154(b) by 0 days.

(21) Appl. No.: 15/049,725

(22) Filed: Feb. 22, 2016

(65) Prior Publication Data

US 2017/0244330 A1    Aug. 24, 2017

(51) Int. Cl.
*H02M 3/335* (2006.01)
*H02M 1/34* (2007.01)

(52) U.S. Cl.
CPC ......... *H02M 3/33546* (2013.01); *H02M 1/34* (2013.01)

(58) Field of Classification Search
CPC ........ H02M 1/34; H02M 3/135; H02M 3/137; H02M 3/156; H02M 3/158; H02M 2001/34; H02M 2001/346
See application file for complete search history.

(56) References Cited

U.S. PATENT DOCUMENTS

| | | | | |
|---|---|---|---|---|
| 5,260,607 A | * | 11/1993 | Kinbara | H02M 1/34 327/427 |
| 7,385,833 B2 | * | 6/2008 | Keung | H02M 3/158 323/222 |
| 2009/0160534 A1 | * | 6/2009 | Jansen | H02M 7/538 327/536 |
| 2009/0296429 A1 | * | 12/2009 | Cook | H02M 1/34 363/40 |
| 2012/0249059 A1 | * | 10/2012 | Matsumae | H02M 3/337 320/107 |
| 2015/0085534 A1 | * | 3/2015 | Abramovitz | H02M 1/34 363/21.01 |
| 2015/0244254 A1 | * | 8/2015 | Skinner | H02M 3/33507 323/222 |
| 2016/0226372 A1 | * | 8/2016 | Willenberg | H02M 1/34 |

* cited by examiner

*Primary Examiner* — Matthew Nguyen
(74) *Attorney, Agent, or Firm* — Murphy, Bilak & Homiller, PLLC

(57) ABSTRACT

A power converter circuit includes a switching circuit with at least one electronic switch, a capacitor configured to provide or receive a voltage with a predefined voltage level, at least one first inductor, and a snubber circuit. The snubber circuit includes at least one second inductor inductively coupled to the at least one first inductor and electrically coupled to the capacitor.

13 Claims, 7 Drawing Sheets

POWER CONVERTER WITH A SNUBBER CIRCUIT

TECHNICAL FIELD

This disclosure in general relates to a power converter, in particular a switched mode power converter.

BACKGROUND

Switched-mode power converters are widely used in many different electronic applications such as automotive, industrial, household or consumer electronic applications, to name only a few. A power converter is configured to convert an input power received at an input into an output power available at an output. The input power is defined by an input current and an input voltage received at the input, and the output power is defined by an output current and an output voltage available at an output, wherein at least one parameter of at least one of the input current and the input voltage is different from the corresponding parameter of the output current and the output voltage. A DC/DC converter, for example, may receive a DC input voltage with a first voltage level and supply a DC output voltage with a second level higher or lower than the first level. An AC/DC converter, for example, may receive an AC input voltage and supply a DC output voltage.

A power converter includes a plurality of electronic devices. These devices may include parasitic inductances and/or parasitic capacitances. For example, a transformer may include a parasitic inductance (often referred to as leakage inductance) and a power transistor such as a power MOSFET may include a parasitic capacitance (often referred to as output capacitance). Such parasitic devices may form a parasitic resonant circuit, whereas the parasitic resonant circuit can be excited during operation of the power converter. Exciting a parasitic resonant circuit can cause voltage oscillations with voltage amplitudes that exceed the voltage rating of the devices employed in the power converter. There is therefore a need to limit the amplitude of parasitic oscillations in a power converter.

SUMMARY

One example relates to a power converter circuit. The power converter circuit includes a switching circuit with at least one electronic switch, a capacitor configured to provide or receive a voltage with a predefined voltage level, at least one first inductor, and a snubber circuit. The snubber circuit includes at least one second inductor inductively coupled to the at least one first inductor and electrically coupled to the capacitor.

Those skilled in the art will recognize additional features and advantages upon reading the following detailed description, and upon viewing the accompanying drawings.

BRIEF DESCRIPTION OF THE DRAWINGS

Examples are explained below with reference to the drawings. The drawings serve to illustrate certain principles, so that only aspects necessary for understanding these principles are illustrated. The drawings are not to scale. In the drawings the same reference characters denote like features.

DETAILED DESCRIPTION

In the following detailed description, reference is made to the accompanying drawings. The drawings form a part of the description and by way of illustration show specific embodiments in which the invention may be practiced. It is to be understood that the features of the various embodiments described herein may be combined with each other, unless specifically noted otherwise.

Figure 1:
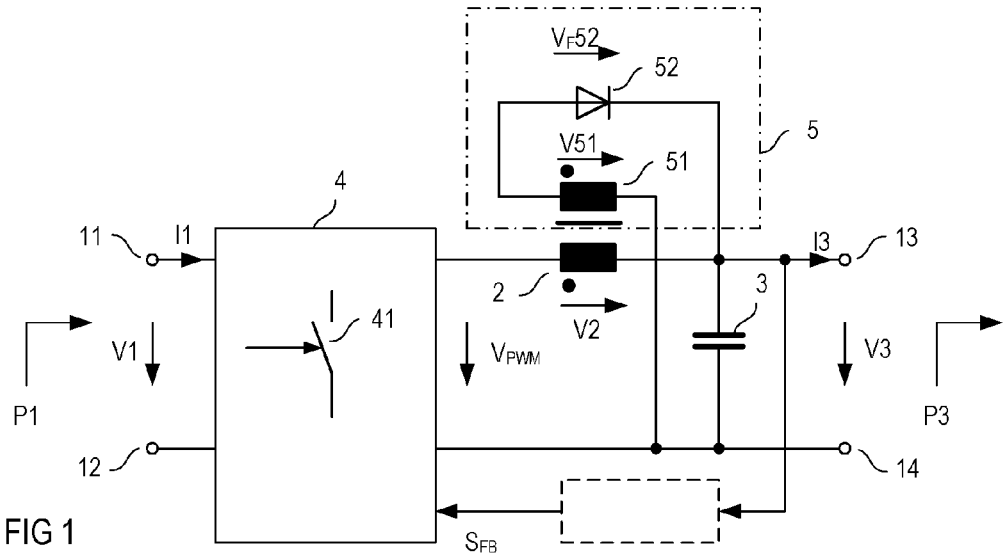
FIG. 1 shows a power converter circuit with a switching circuit, a first inductor, a capacitor, and a snubber circuit according to one example.

FIG. 1 shows a power converter circuit according to one example. The power converter circuit includes a first inductor 2, a capacitor 3, a switching circuit 4, and a snubber circuit 5. The snubber circuit 5 includes a second inductor 51 inductively coupled to the first inductor 2 and electrically coupled to the capacitor 3. In the example shown in FIG. 1, the second inductor 51 is electrically coupled to the capacitor 3 via a rectifier element 52. For example, the rectifier element 52 is a bipolar diode (as shown), a Schottky diode, or the like.

Referring to FIG. 1, the power converter circuit includes a first port at circuit nodes 11, 12 and a second port at circuit nodes 13, 14. The power converter circuit is configured to receive an input power at one of the first and second ports and to provide an output power at the other one of the first and second ports. Just for the purpose of explanation it is assumed that the input power P1 is received at the first port 11, 12 and that the output power P3 is provided at the second port 13, 14. In this case, the first port 11, 12 may be referred to as input and the second port 13, 14 may be referred to as output of the power converter. The input power P1 is defined by a voltage V1 between the circuit nodes 11, 12 of the first port and a current I1 at the first port, and the output power P3 is defined by a voltage V3 between the circuit nodes 13, 14 of the second port and a voltage I3 at the second port. The voltage V1 and the current I1 at the first port 11, 12 will be referred to as input voltage V1 and input current I1 in the following, and the voltage V3 and the current I3 at the second port will be referred to as output voltage V3 and output current I3 in the following.

According to one example, the power converter circuit is configured to convert the input power P1 into the output power P3 such that at least one of the signal waveform and the voltage level of the input voltage V1 is different from the signal waveform and the voltage level, respectively, of the output voltage V3. According to one example, the power converter is a DC/DC power converter so that both the input voltage V1 and the output voltage V3 are DC voltages, but have different voltage levels. According to one example, the power converter circuit is configured to generate the output voltage V3 with a lower voltage level than the input voltage V1, and according to another example, the power converter circuit is configured to generate the output voltage V3 with a higher voltage level than the input voltage V1.

According to one example, the power converter circuit is configured to regulate the voltage level of the output voltage V3 such that a voltage level of the output voltage V3 has a predefined voltage level. To regulate the output voltage V3 the switching circuit 4 generates a pulse-width voltage $V_{PWM}$ based on a feedback signal $S_{FB}$. In the power converter circuit shown in FIG. 1, the inductor 2 and the capacitor 3 are connected in series and the series circuit with the inductor 2 and the capacitor 3 receives the pulse-width modulated voltage $V_{PWM}$ generated by the switching circuit 4.

For example, the feedback signal $S_{FB}$ is generated by a feedback circuit 7 (illustrated in dashed lines in FIG. 1) that receives the output signal that is to be regulated. For example, if the output voltage V3 is to be regulated the feedback circuit 7 receives the output voltage V3 (as shown) or a signal representing the output voltage V3. If the output current I3 is to be regulated the feedback circuit 7 receives the output voltage or a signal representing the output current I3. According to one example, the feedback circuit 7 is configured to generate an error signal based on the output signal and a reference signal and to filter the error signal in order to obtain the feedback signal. Filtering the error signal may include using a filter with one of a proportional (P) characteristic, a proportional-integral (PI) characteristic, a proportional-integral-derivative (PID) characteristic, or the like.

Figure 2:
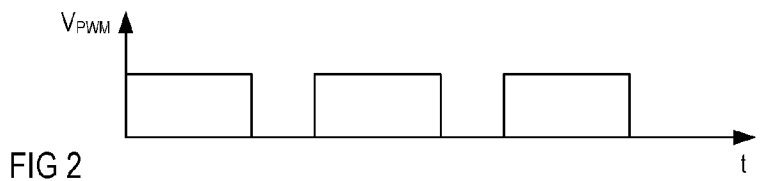
FIG. 2 shows a waveform diagram of a voltage provided by the switching circuit, according to one example.

A signal diagram of a pulse-width modulated voltage $V_{PWM}$ according to one example is shown in FIG. 2. Referring to FIG. 2, the pulse-width modulated voltage $V_{PWM}$ includes a sequence of voltage pulses which are timely spaced apart from each other by pause periods. According to one example, the switching circuit 4 is configured to regulate the output voltage V3 by varying, based on the feedback signal $S_{FB}$) at least one of a duration of the voltage pulses and the pause periods between the voltage pulses. This is commonly known as varying a duty-cycle of the PWM voltage $V_{PWM}$. Varying the duty cycle of a PWM voltage such as the PWM voltage shown in FIG. 1 based on a feedback signal such as the feedback signal $S_{FB}$ shown in FIG. 1 is commonly known in power converter circuits so that no further explanation is required in this regard.

The switching circuit 4 may include parasitic capacitances, examples of which are explained in greater detail herein below. These parasitic capacitances together with the first inductor 2 and/or parasitic inductances in the switching circuit 4 may form a resonant circuit which may be excited by the switched-mode operation of the switching circuit 4. Excitation of this resonant circuit may result in high voltage peaks of the voltage $V_{PWM}$ at the output of the switching circuit and, therefore, across the first inductor 2 and the capacitor. The snubber circuit 5 serves to limit these voltage peaks in the way explained in the following.

A voltage V51 across the second inductor 51 is given by $$V51 = V3 + V_F 52 \tag{1},$$

where $V_F 52$ is the forward voltage of the rectifier element 52. If the output voltage V3 is significantly higher than the forward voltage $V_F 52$, the forward voltage can be neglected, so that the voltage V51 across the second inductor 51 is substantially given by the output voltage V3. By virtue of the voltage V3 having a predefined (regulated) voltage level, the voltage V51 across the second inductor 51 is substantially clamped to the regulated voltage level of the voltage V3, as explained in the following. The voltage across the series circuit with the first inductor 2 and the capacitor 3 is given by $$V_{PWM} = V2 + V3 \tag{2}.$$

By virtue of the first inductor 2 being inductively coupled with the second inductor 51, the voltage across the first inductor 2 is given by (clamped to)

$$V2 = \frac{N_2}{N_{51}} \cdot V51 = \frac{N_2}{N_{51}} \cdot V3 \tag{3}$$

here $N_{51}$ denotes the number of turns of the second inductor 51, and $N_2$ denotes the number of turns of the first inductor 2. Using equations (2) and (3), a maximum voltage level of the output voltage of the switching circuit 4 is given by $$V_{PWM} = V3 \cdot \left(1 + \frac{N_2}{N_{51}}\right), \tag{4}$$

Thus, the snubber circuit 5 limits (clamps) the output voltage $V_{PWM}$ of the switching circuit 4 to a voltage level defined by the voltage level of the regulated voltage V3 and a winding ratio $N_{51}/N_2$ of the second inductor 51 and the first inductor 2. The first inductor 2 and the capacitor 3 are circuit elements required to ensure proper operation of the power converter circuit so that only two additional circuit elements, namely the second inductor 51 and the rectifier element 52, are additionally required to provide for the voltage clamping (snubber) capability.

Figure 3:
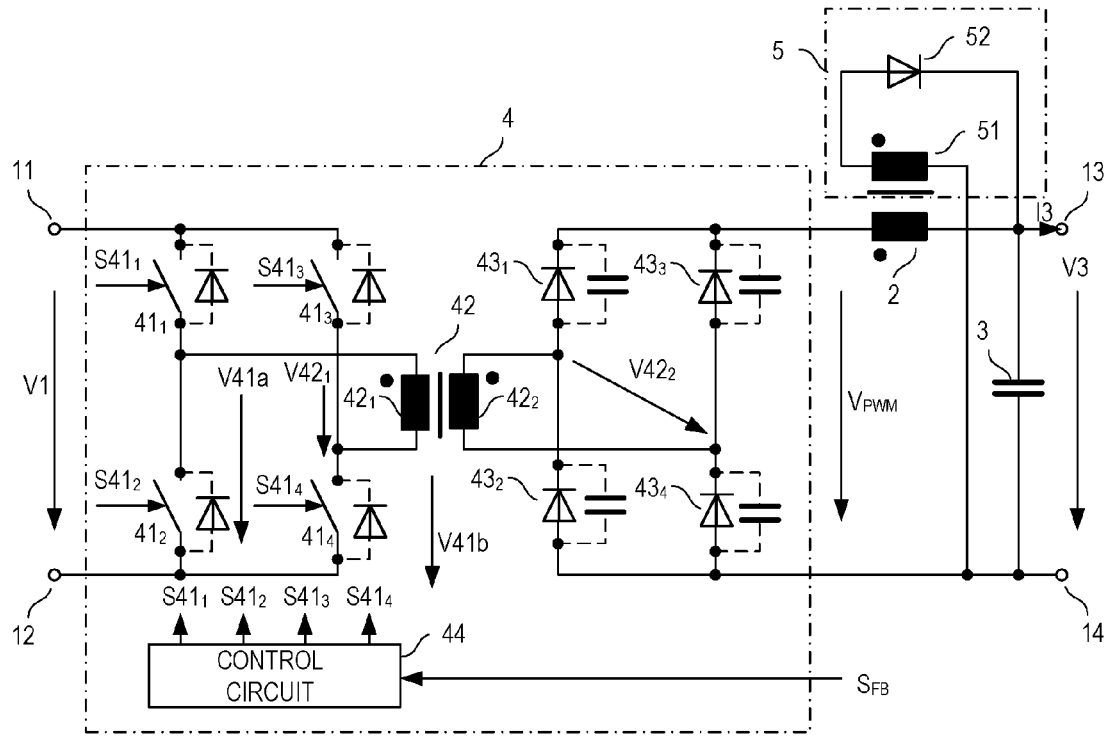
FIG. 3 shows one example of the switching circuit in greater detail.

The switching circuit 4 can be implemented in many different ways. Some examples of how the switching circuit 4 can be implemented are explained below. FIG. 3 shows one example of a power converter circuit with a full-bridge phase-shift topology. In this power converter circuit, the switching circuit 4 includes a full-bridge coupled to the input 11, 12, a rectifier circuit coupled to the series circuit with a first inductor 2 and a capacitor 3, and a transformer 42 coupled between the full-bridge and the rectifier circuit. The full-bridge includes a first half-bridge and a second half-bridge. The first half-bridge includes a first electronic switch $41_1$ and a second electronic switch $41_2$ connected in series between the circuit nodes 11, 12 of the input, and the second half-bridge includes a third electronic switch $41_3$ and a fourth electronic switch $41_4$ connected in series between the circuit nodes 11, 12 of the input. A circuit node common to the first switch $41_1$ and the second switch $41_2$ forms an output of the first half-bridge, and a circuit node common to the third switch $41_3$ and the fourth switch $41_4$ forms an output of the second half-bridge. A primary winding $42_1$ of the transformer 42 is connected between the output of the first half-bridge and the output of the second half-bridge. The rectifier circuit can be implemented as a full-bridge rectifier, as shown in FIG. 3. In this case, the rectifier circuit includes a first series circuit with a first rectifier element $43_1$ and a second rectifier element $43_2$ and a second series circuit with a third rectifier element $43_3$ and a fourth rectifier element $43_4$. Each of these series circuits is connected in parallel with the series circuit including the first inductor 2 and the capacitor 3. A secondary winding $42_2$ of the transformer 42 is connected between a tap of the first series circuit and a tap of the second series circuit. The tap of the first series circuit is a circuit node common to the first rectifier element $43_1$ and the second rectifier element $43_2$, and the tap of the second series circuit is a circuit node common to the third rectifier element $43_3$ and the fourth rectifier element $43_4$.

A control circuit 44 modulates a voltage $V42_1$ across the primary winding $42_1$ of the transformer by controlling operation of the full-bridge. The primary winding $42_1$ and the secondary winding $42_2$ have the same winding sense so that a voltage $V42_2$ across the secondary winding $42_2$ is substantially proportional to the voltage $V42_1$ across a primary winding $42_1$. In particular, $V42_2=V42_1/n$, wherein n is the transformer winding ratio, which is given by the number $N42_1$ of turns of the primary winding $42_1$ divided by the number $N42_2$ of turns of the secondary winding.

Figure 4:
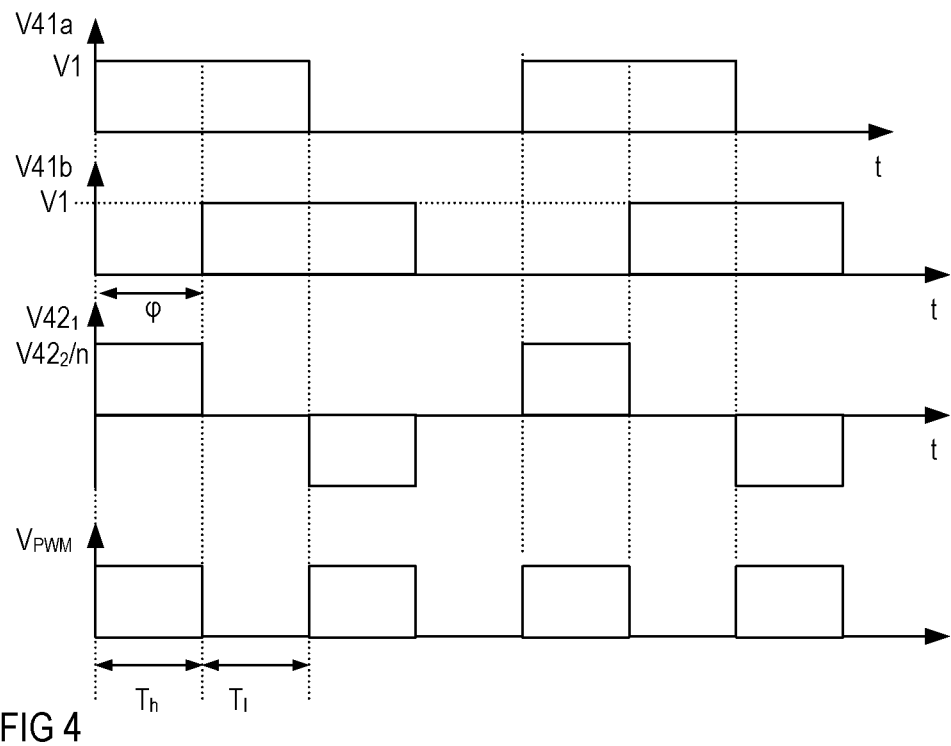
FIG. 4 shows example signal diagrams of signals occurring in the switching circuit shown in FIG. 3.

One way of operation of the power converter shown in FIG. 3 is explained with reference to FIG. 4. FIG. 4 shows timing diagrams of an output voltage V41a of the first half-bridge, an output voltage V41b of the second half-bridge, the voltage $V42_1$ across the primary winding $42_1$, and the pulse-width modulated voltage $V_{PWM}$ at an output of the switching circuit 4. Referring to FIG. 3, the output voltage V41a of the first half-bridge is a voltage between the output of the first half-bridge and the second circuit node 12, the output voltage V41b of the second half-bridge is the voltage between the output of the second half-bridge and the second input node 12, and the voltage $V42_1$ across the primary winding $42_1$ is given by the output voltage V41a of the first half-bridge minus the output voltage V41b of the second half-bridge. According to one example, the control circuit 4 is configured to control operation of the first half-bridge and the second half-bridge such, that each of the output voltages V41a, V41b is a pulse-width modulated voltage with a duty-cycle of substantially 50%. There is a phase-shift ϕ between these output voltages V41a, V41b so that the voltage $V42_1$ across the primary winding $42_1$ includes positive voltage pulses, negative voltage pulses and pause periods between the individual voltage pulses. That is, the voltage $V42_1$ across the primary winding $42_1$ has three different voltage levels, a positive level, zero, and a negative level. The absolute value of each of the positive level and the negative level is substantially given by the voltage level of the input voltage V1 (if voltage drops across the individual electronic switches $41_1$-$41_4$ are neglected).

Referring to the above, and as shown in FIG. 4, the voltage $V42_2$ across the secondary winding $42_2$ has the same signal waveform as the voltage $V42_1$ across the primary winding $42_1$ but a different absolute value of the positive level and the negative level. The rectifier circuit $43_1$-$43_4$ rectifies the voltage $V42_2$ across the secondary winding to generate the pulse-width modulated output voltage $V_{PWM}$ of the switching circuit 4, so that the pulse-width modulated output voltage $V_{PWM}$ is a rectified version of the voltage $V42_2$ across the secondary winding $42_2$. The pulse-width modulated output voltage $V_{PWM}$ has a duty-cycle D, which is given by $$D=T_h/(T_h+T_l) \tag{5}$$

where $T_h$ is the duration of a voltage pulse, and $T_l$ is the duration of a pause period between two voltage pulses. By varying this duty-cycle D, the electric power provided to the series circuit with the first inductor 2 and the capacitor 3 and, therefore, the output voltage V3 can be regulated.

In the power converter circuit shown in FIG. 3, the duty-cycle of the pulse-width modulated output voltage $V_{PWM}$ of the switching circuit 4 can be adjusted by adjusting the phase-shift ϕ between the output voltages V41a and V41b of the half-bridges. According to one example, the control circuit 44, which controls operation of the switches $41_1$-$41_4$ via drive signals $S41_1$, $S41_2$, $S41_3$, $S41_4$, is configured to vary the phase-shift ϕ of these voltages V41a, V41b based on the feedback signal $S_{FB}$ in order to regulate the output voltage V3.

The rectifier elements $43_1$-$43_4$ of the rectifier circuit may include parasitic capacitances. These parasitic capacitances are illustrated as capacitors in dashed lines in FIG. 3. The rectifier elements $43_1$-$43_4$ can be passive rectifier elements, such as bipolar diodes (as shown), Schottky diodes, or the like. In case of bipolar diodes, the parasitic capacitances can include junction capacitances of the bipolar diodes.

In the power converter circuit shown in FIG. 3, the electronic switches $41_1$-$41_4$ of the full-bridge are schematically illustrated as switches controlled by the control circuit 44. For example, these electronic switches $41_1$-$41_4$ are transistors such as MOSFETs (Metal Oxide Semiconductor Field-Effect Transistors), IGBTs (Insulated Gate Bipolar Transistors), BJTs (Bipolar Junction Transistors), HEMTs (High Electron Mobility Transistors), or the like. Optionally, a freewheeling element such as a diode (illustrated in dashed lines in FIG. 2) is connected in parallel with at least one or each of the electronic switches $41_1$-$41_4$. These freewheeling elements allow a current to flow in one direction given by the forward direction of the respective freewheeling element when the corresponding switch has been switched off. The freewheeling elements may be used to clamp the voltage across the corresponding electronic switch $41_1$-$41_4$ to zero before the electronic switch $41_1$-$41_4$ switches on. This is known as zero voltage switching (ZVS).

Figure 5:
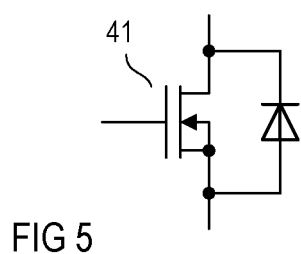
FIG. 5 shows one example of how the at least one switch in the switching circuit can be implemented.

According to one example, shown in FIG. 5, at least one or each of the electronic switches $41_1$-$41_4$ is implemented as a MOSFET. The MOSFET 41 shown in FIG. 5 represents one of these four electronic switches of the full-bridge. A MOSFET includes an internal diode (often referred to as body diode) between a drain node and a source node. This body diode can be used as the respective freewheeling element described above so that no additional freewheeling element is required when implementing the electronic switch as a MOSFET. The body diode is explicitly shown in FIG. 5.

Figure 6:
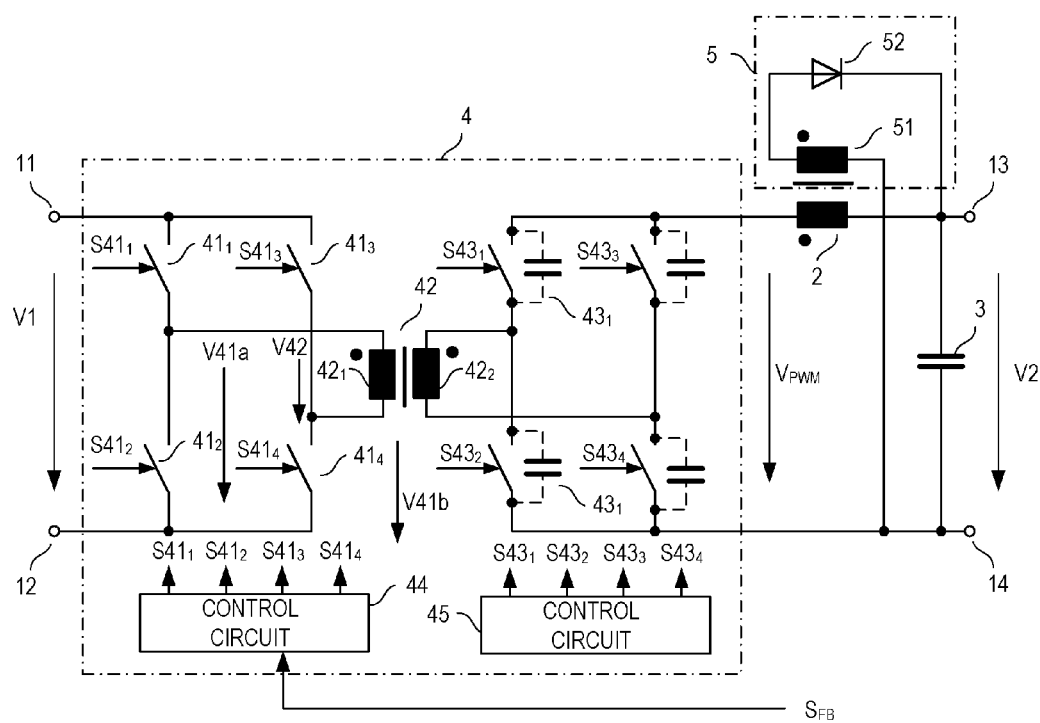
FIG. 6 shows a switching circuit according to another example.
Figure 7:
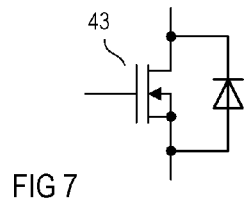
FIG. 7 shows one example of how rectifier switches in the switching circuit shown in FIG. 6 can be implemented.

FIG. 6 shows a modification of the power converter circuit shown in FIG. 3. In the power converter circuit shown in FIG. 6, the rectifier circuit includes active rectifier elements (which are drawn as electronic switches in FIG. 6) instead of passive rectifier elements shown in FIG. 3. Referring to FIG. 7, each of these active rectifier elements can be implemented as a transistor, such as a MOSFET. According to one example, these MOSFETs are connected such that their internal body diodes are interconnected in the same way as the passive rectifier elements shown in FIG. 3. The active rectifier elements $43_1$-$43_4$ are controlled by a control circuit 45 that generates drive signals $S43_1$-$S43_4$ for these active rectifier elements $43_1$-$43_4$. According to one example, the control circuit 45 is configured to sense a voltage across the individual active rectifier elements $43_1$-$43_4$ and is configured to switch on the respective active rectifier element when the sensed voltage indicates that the corresponding body diode is forward biased. Using a rectifier circuit with active rectifier elements instead of passive rectifier elements, as shown in FIG. 3, can help to reduce losses occurring in the power converter circuit.

Figure 8:
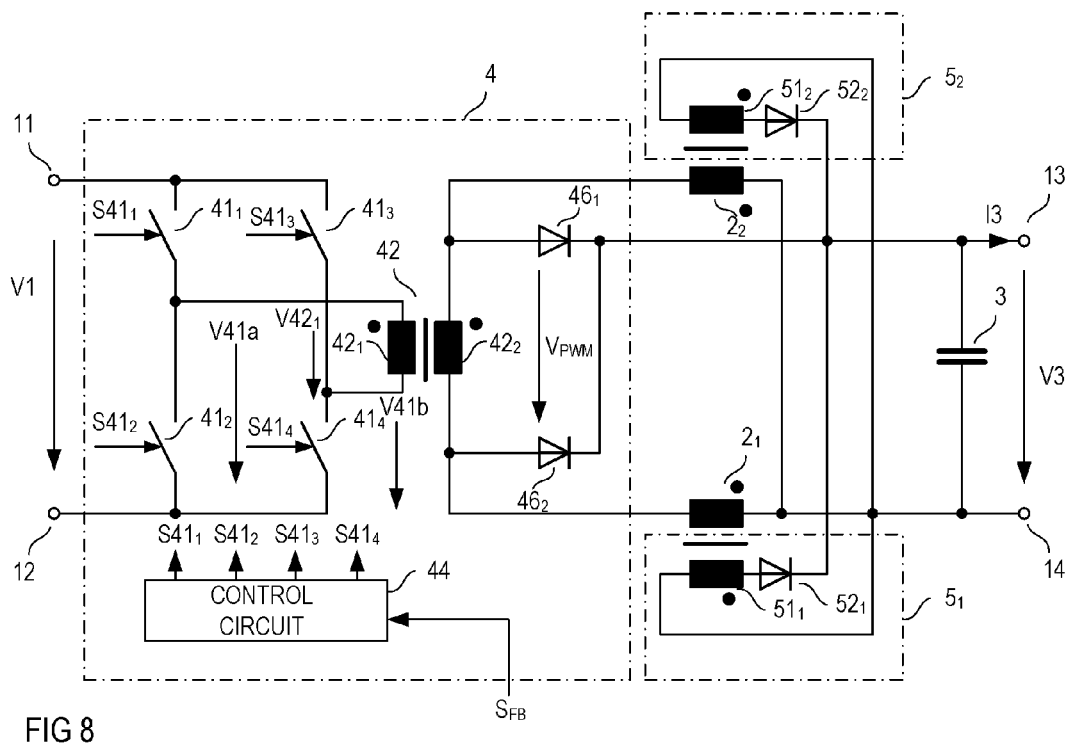
FIG. 8 shows a power converter circuit with two first inductors and two snubber circuits.

FIG. 8 shows a power converter circuit according to another example. The power converter circuit shown in FIG. 8 is based on the power converter circuit shown in FIG. 3 and includes a full-bridge $41_1$-$41_4$ controlled by a control circuit 44 and connected between an input 11, 12 and a primary winding $42_1$ of a transformer 42. Coupled to a secondary winding $42_2$ of the transformer $42_1$ the switching circuit 4 includes two rectifier elements, a first rectifier element $46_1$ connected between a first circuit node of the secondary winding $42_2$ and a first node 13 of the output 13, 14, and a second rectifier element $46_2$ connected between a second circuit node of the secondary winding $42_2$ and the first node 13 of the output 13, 14. Furthermore, the power converter circuit includes two first inductors, one inductor $2_1$ connected between the second circuit node of the secondary winding $42_2$ and a second node 14 of the output 13, 14, and another inductor $2_2$ connected between the first circuit node of the secondary winding $42_2$ and the second node 14 of the output 13, 14. This secondary side topology with the secondary winding $42_2$, the two rectifier elements $46_1$, $46_2$ and the two first inductors $2_1$, $2_2$ is usually referred to as current doubler topology.

In this topology, voltage peaks of the output voltage $V_{PWM}$ of the switching circuit 4 may affect both first inductors $2_1$, $2_2$. Thus, the power converter circuit shown in FIG. 8 includes two snubber circuits, a first snubber circuit $5_1$ inductively coupled with the first inductor $2_1$, and a second snubber circuit $5_2$ inductively coupled with the other first inductor $2_2$. Each of these first and second snubber circuits $5_1$, $5_2$ is implemented like the snubber circuit 5 explained with reference to FIG. 1. That is, each of these snubber circuits $5_1$, $5_2$ includes a second inductor $51_1$, $51_2$ inductively coupled with the respective first inductor $2_1$, $2_2$, and a rectifier element $52_1$, $52_2$ connected in series with the respective second inductor $51_1$, $51_2$. Each of the series circuits with one second inductor $51_1$, $51_2$ and one rectifier element $52_1$, $52_2$ is connected in parallel with the capacitor 3.

The operating principle of the power converter circuit shown in FIG. 8 is similar to the operating principle of the power converter circuit shown in FIG. 3. The control circuit 44 receives the feedback signal $S_{FB}$ and generates a 3-level signal $V42_1$ across the primary winding $42_1$ of the transformer 42 in the way explained with reference to FIG. 4. In the power converter circuit shown in FIG. 8, however, the output signal $V_{PWM}$ of the switching circuit 4 is a 3-level signal which is in phase with the voltage $V42_2$ across the secondary winding. A voltage level of the output voltage $V_{PWM}$ substantially equals the voltage level of the secondary side voltage $V42_2$ (to be more precisely, the voltage level of the output voltage $V_{PWM}$ equals the voltage level of the secondary side voltage $V42_2$ minus the forward voltage of the rectifier element $46_1$, $46_2$). When the output voltage $V_{PWM}$ has a positive voltage pulse, the secondary side current flows through the rectifier element $46_1$, the capacitor 3 and the first inductor $2_1$, and when the output voltage $V_{PWM}$ has a negative voltage pulse, the secondary side current flows through the rectifier element $46_2$, the output capacitor 3 and the first inductor $2_2$.

Figure 9:
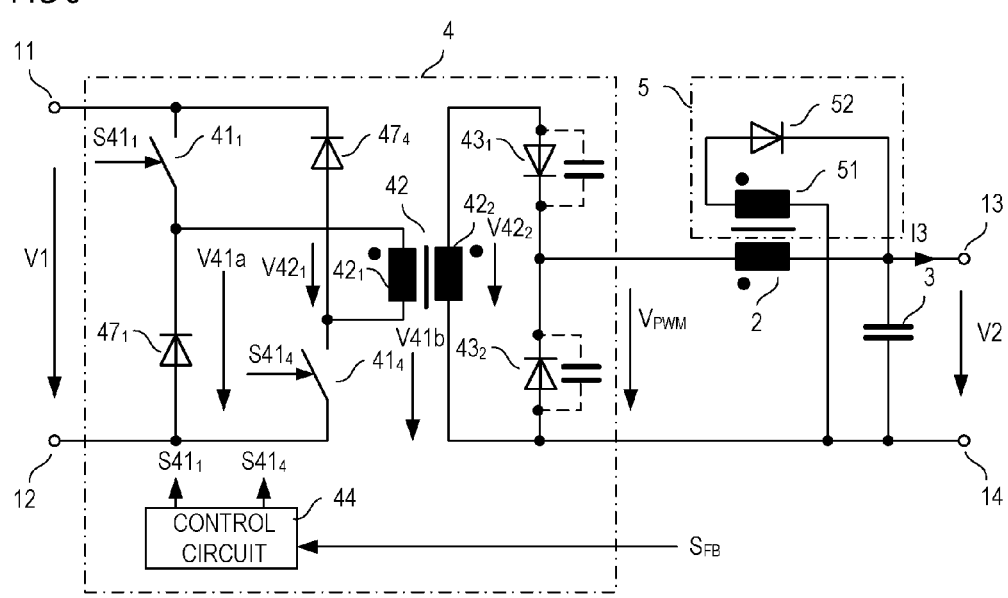
FIG. 9 shows a switching circuit according to another example.

FIG. 9 shows a power converter circuit according to another example. This power converter circuit is based on the power converter circuit shown in FIG. 3 and is different from the power converter circuit shown in FIG. 3 in that the switching circuit 4 on the secondary side includes only two rectifier elements $43_1$. $43_3$ instead of a full-bridge rectifier. The rectifier circuit with the two rectifier elements $43_1$, $43_3$ shown in FIG. 9 can be obtained from the rectifier circuit with the four rectifier elements $43_1$-$43_4$ shown in FIG. 3 by omitting rectifier element $43_2$ and replacing rectifier element $43_4$ with a short-circuit. Thus, a first circuit node of the secondary winding $42_2$ is connected to the first inductor 2 via rectifier element $43_1$, and a second circuit node of the secondary winding $42_2$ is connected to the second node 14 of the output 13, 14.

On the primary side, the power converter circuit shown in FIG. 9 includes a full-bridge connected between the input 11, 12 and the primary winding $42_1$. However, the full-bridge shown in FIG. 9 is different from the one shown in FIG. 3 in that each of the first and second half-bridges includes a series circuit with one electronic switch $41_1$, $41_4$, respectively, and a rectifier element $47_1$, $47_4$, respectively. The operating principle of the primary side circuit is similar to the operating principle of the primary side circuit shown in FIG. 3. The electronic switches $41_1$ and $41_4$ are switched on and off simultaneously (synchronously) by the control circuit 44. In the on-state of the electronic switches $41_1$, $41_4$ the voltage $V42_1$ across the primary winding substantially equals the input voltage V1; on the secondary side the current then flows through the rectifier element $43_1$ connected between the second inductor 2 and the secondary winding $42_2$, the second inductor 2, the output capacitor 3 and the output 13, 14, respectively. When the electronic switches $41_1$, $41_4$ switch off the voltage across the primary winding $42_1$ changes its polarity and has a voltage level that is given by the input voltage V1 plus forward voltages of the rectifier elements $47_2$, $47_4$ on the primary side. Usually these forward voltages are much smaller than the input voltage so that voltage $V42_1$ across the primary winding $42_1$ is substantially given by −V1 (the inverted input voltage) after the electronic switches $41_1$. $41_4$ have been switched off and until the transformer 42 has been demagnetized. After the electronic switches $41_1$, $41_4$ have switched off the voltage $V42_2$ across the secondary winding $42_2$ also changes its polarity so that the rectifier element $43_1$ prevents a current flow through the secondary winding $42_2$; a freewheeling current driven by energy magnetically stored in the first inductor 2 flows through the first inductor 2, the capacitor 3 and the output 13, 14, respectively, and the further rectifier element $43_2$ on the secondary side. Of course, in each of the power converter circuits shown in FIGS. 8 and 9, the rectifier element 2 $46_1$, $46_2$, $43_1$ and $43_3$ can be replaced by active rectifier elements as explained with reference to FIGS. 6 and 7 herein before.

Figure 10:
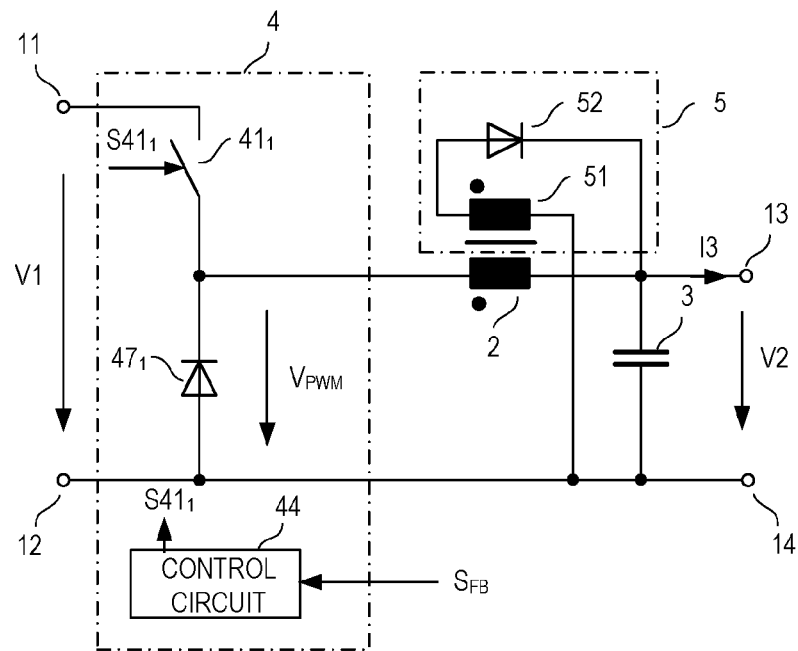
FIG. 10 shows a switching circuit according to yet another example.

The power converter circuits explained before each have an isolated topology. That is, the input 11, 12 and the output 12, 14 are galvanically isolated by a transformer 42. The use of the snubber circuit 5 explained before, however, is not restricted to power converters with an isolated topology, but may be used in power converter circuits with a non-isolated topology as well. FIG. 10 shows one example of a power converter circuit with a non-isolated topology. This power converter circuit is implemented as buck converter. In this case, the switching circuit 4 includes a half-bridge with a first electronic switch $41_1$ and a rectifier element $47_1$ connected between the first circuit node 11 and the second circuit node 12 of the input. The series circuit with the first inductor 2 and the capacitor 3 is connected in parallel with the rectifier element $47_2$. In the example shown in FIG. 10, the rectifier element $47_2$ is drawn as a bipolar diode. This, however, is only an example. The rectifier element $47_1$ may be implemented as another type of passive rectifier element, such as a Schottky diode, or an active rectifier element as well. A control circuit 44 receives the feedback signal $S_{FB}$ and controls operation of the first electronic switch $41_1$. In particular, the control circuit 44 controls a duty-cycle of the pulse-width modulated output voltage $V_{PWM}$ of the switching circuit 4.

Figure 11:
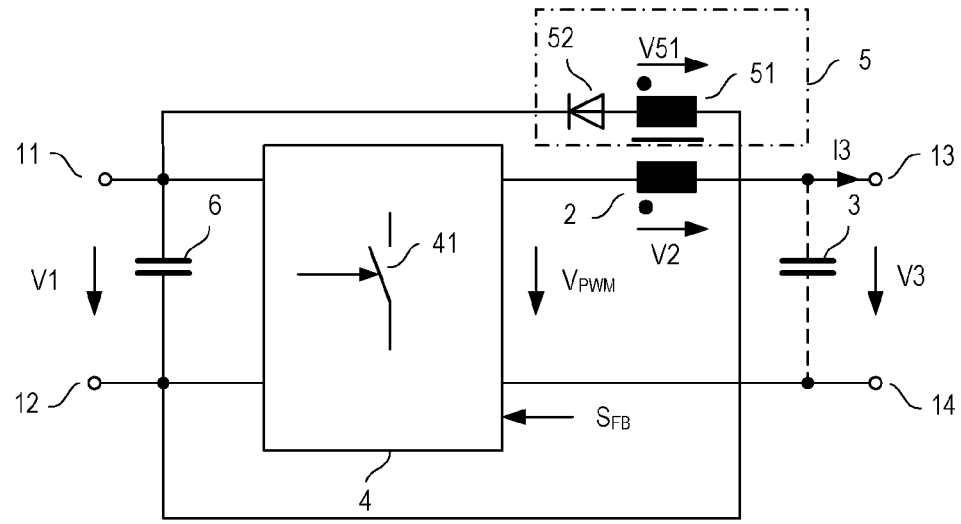
FIG. 11 shows a power converter circuit according to another example.

In the power converter circuits explained herein before, the second inductor 51 of the snubber circuit 5 are coupled to a capacitor 3 connected between the circuit nodes 13, 14 of the output. This, however, is only an example. According to another example, shown in FIG. 11, the power converter circuit includes a capacitor 6 connected between the first circuit node 11 and the second circuit node 12 of the input, and the second inductor 51 of the snubber circuit 5 is connected to the capacitor 6, which will be referred to as input capacitor in the following. In particular, a series circuit with a second inductor 51 and the rectifier element 52 is connected in parallel with the input capacitor 6. The switching circuit 4, which is only schematically shown in FIG. 11, can be implemented in accordance with any of the switching circuits 4 explained herein before.

In the power converter circuits explained above, the second inductor 2 is connected between the switching circuit 4 and the output 13, 14. This, however, is only an example. According to another example, shown in FIG. 12, the second inductor 2 is connected between the input 11, 12 and the switching circuit 4. In the example shown in FIG. 12, the second inductor 51 of the snubber circuit 5 is connected to the input capacitor 6. This, however, is only an example. According to another example (not shown), the second inductor 51 is connected to the output capacitor 3.

Figure 12:
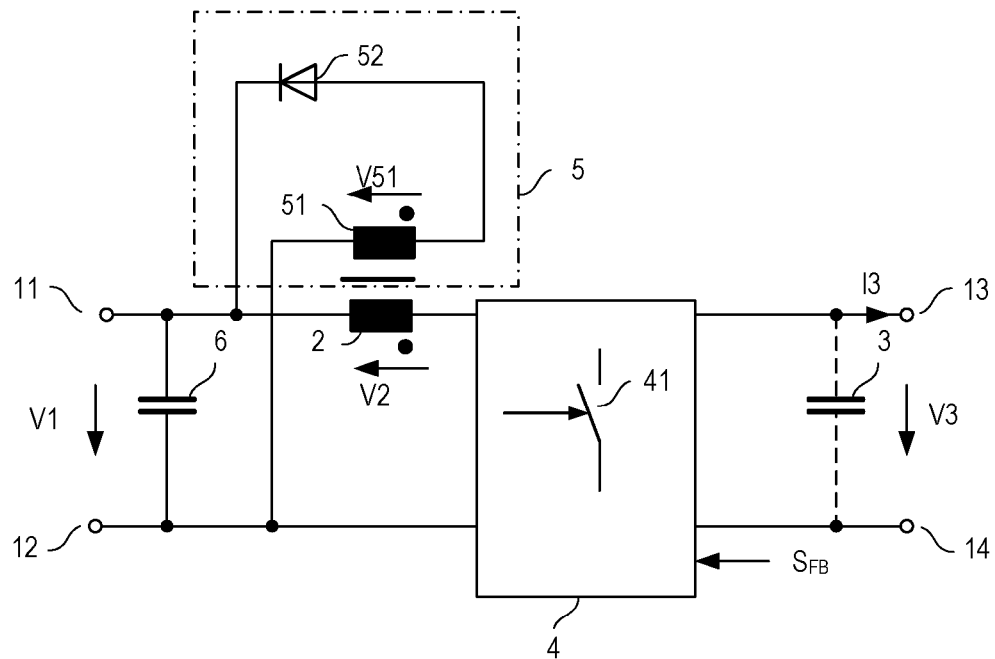
FIG. 12 shows a power converter circuit according to another example.
Figure 13:
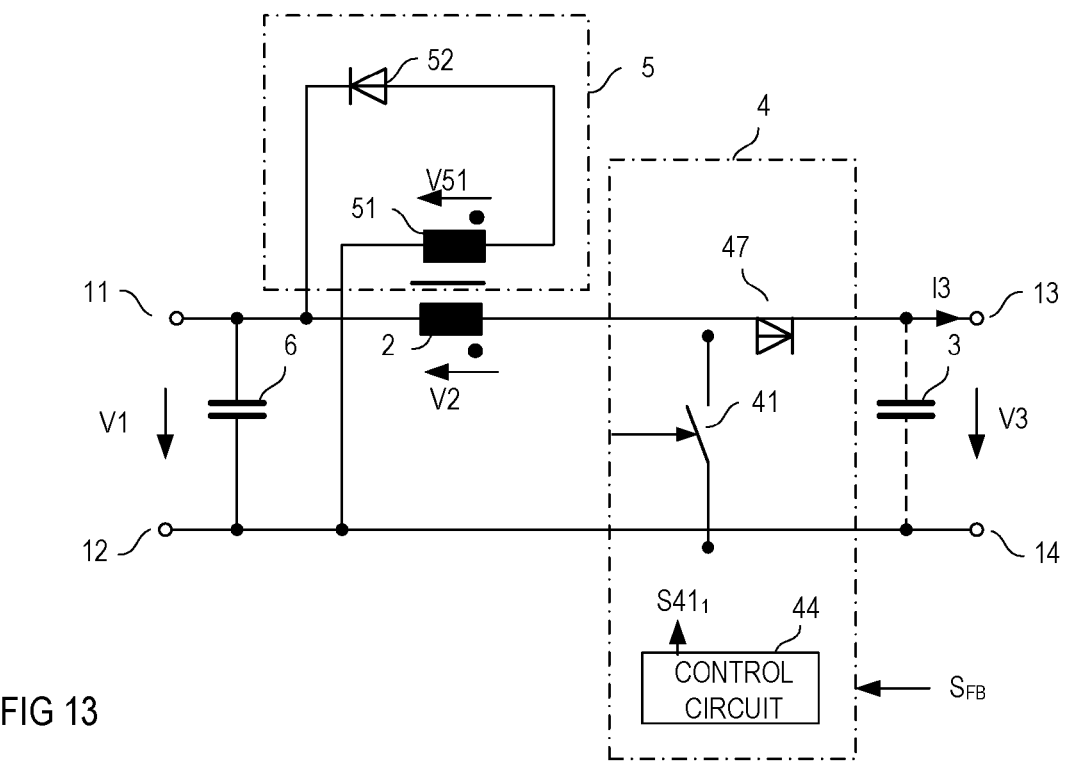
FIG. 13 shows a power converter circuit according to another example.

FIG. 13 shows one example of the switching circuit 4 shown in FIG. 12. In this example, the power converter circuit has a boost converter topology. In this case, the switching circuit 4 includes a switch connected in parallel with a series circuit that includes the input capacitor 6 and the first inductor 2. A rectifier element 47 is connected between a circuit node common to the switch 41 and the first inductor 2 and the first circuit node 13 of the output. An output capacitor 3 is connected in parallel with the series circuit including the switch 41 and the rectifier element 47. A control circuit 44 controls operation of the switch 41 such that one of the output voltage V3 and the output current I3 has a predefined signal level.

Figure 14:
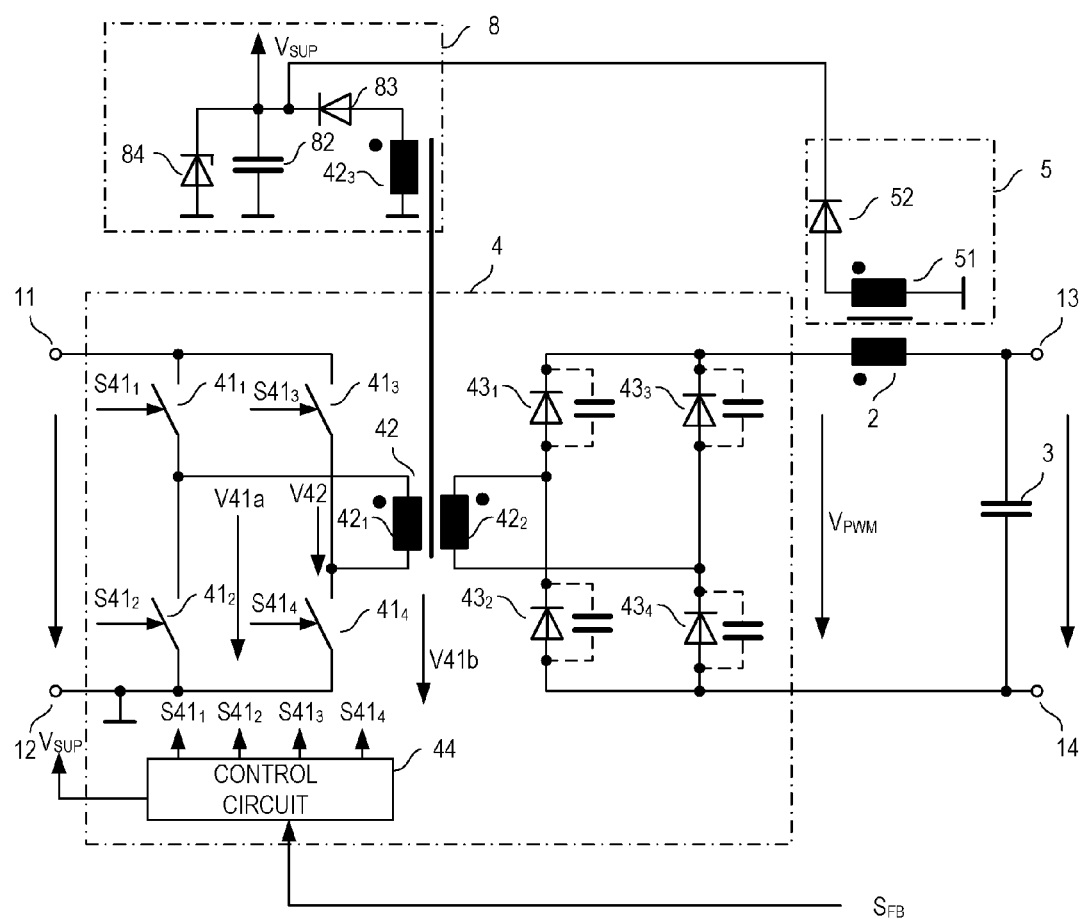
FIG. 14 shows a power converter circuit with an auxiliary voltage source.

In the power converter circuits explained above, the second inductor 51 of the snubber circuit 5 is connected to one of the output capacitor 3 and the input capacitor 6 of the power converter circuit. This, however, is only an example. Basically, the second inductor 51 can be coupled to each capacitor across which a voltage with a predefined or regulated voltage level is available. FIG. 14 shows one example of a power converter circuit, in which the second inductor 51 is coupled to a capacitor 82 of an auxiliary voltage source 8. The power converter circuit shown in FIG. 14 is based on the power converter circuit shown in FIG. 3. This, however, is only an example. Connecting the second inductor 51 to an auxiliary voltage source 8 is not restricted to the specific topology shown in FIG. 14 but may be used in other topologies as well.

Referring to FIG. 14, the auxiliary voltage source includes an auxiliary winding $42_3$ of the transformer 42. This auxiliary winding $42_3$ is inductively coupled with the primary winding $42_1$ and the secondary winding $42_2$. A series circuit with the capacitor 82 and a rectifier element 83 is connected in parallel with the auxiliary winding $42_3$. In this circuit, the capacitor 82 is charged from the auxiliary winding 61 via the rectifier element 83, so that a supply voltage $V_{SUP}$ is available across the capacitor 82. For example, the control circuit 44 receives this supply voltage $V_{SUP}$. A voltage limiting element 84, such as, for example, a Zener diode is connected in parallel with the capacitor 82, so as to limit the supply voltage $V_{SUP}$ to a predefined voltage level.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under," "below," "lower," "over." "upper" and the like, are used for ease of description to explain the positioning of one element relative to a second element. These terms are intended to encompass different orientations of the device in addition to different orientations than those depicted in the figures. Further, terms such as "first," "second" and the like, are also used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a." "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A power converter circuit, comprising:
   a switching circuit comprising a transformer and at least one electronic switch;
   an auxiliary voltage source configured to provide a supply voltage, the auxiliary voltage source comprising a capacitor and a first inductor inductively coupled to the transformer and electrically coupled to the capacitor;
   a voltage regulator coupled to the capacitor;
   a second inductor; and
   a snubber circuit comprising a third inductor inductively coupled to the second inductor and electrically coupled to the capacitor.

2. The power converter circuit of claim 1, wherein the third inductor is coupled to the capacitor via a rectifier element.

3. The power converter circuit of claim 2, wherein the rectifier element comprises a diode.

4. The power converter circuit of claim 1, wherein the switching circuit is configured to regulate an output voltage provided by the power converter circuit.

5. The power converter circuit of claim 1,
wherein the power converter circuit comprises a first port with two circuit nodes and a second port with two circuit nodes, and
wherein the power converter circuit comprises an output capacitor connected between the two circuit nodes of one of the first port and the second port.

6. The power converter circuit of claim 5, wherein the switching circuit is coupled between the first port and the first inductor.

7. The power converter circuit of claim 6, wherein the switching circuit comprises:
at least one half-bridge coupled to the first port and to the transformer; and
a rectifier circuit coupled between the transformer and the second inductor.

8. The power converter circuit of claim 7, wherein the at least one half-bridge comprises two electronic switches.

9. The power converter circuit of claim 7, wherein the at least one half-bridge comprises one electronic switch and one passive rectifier element.

10. The power converter circuit of claim 7, wherein the at least one half-bridge comprises a first half-bridge and a second half-bridge each coupled to the transformer.

11. The power converter circuit of claim 6, wherein the switching circuit comprises:
at least one half-bridge coupled between the first port and the second inductor.

12. The power converter circuit of claim 1, wherein the voltage regulator comprises a voltage limiting element connected in parallel with the capacitor.

13. The power converter of claim 1,
wherein the switching circuit comprises a control circuit configured to control operation of the at least one electronic switch, and
wherein the control circuit receives the supply voltage provided by the auxiliary voltage source.

* * * * *